Aug. 27, 1935. H. PITTLICK 2,012,319
PRESSURE RELEASING DEVICE
Filed July 7, 1932
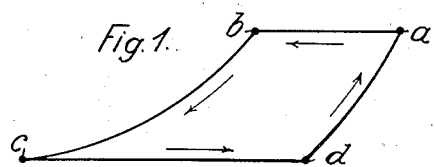
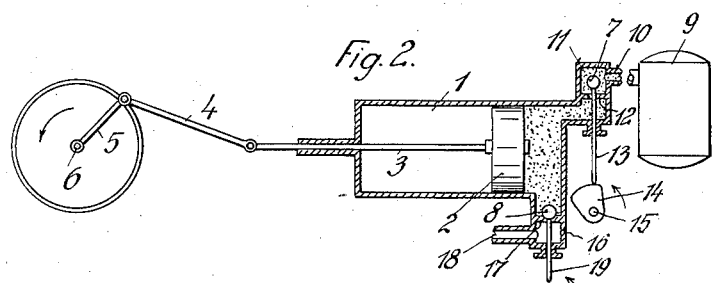
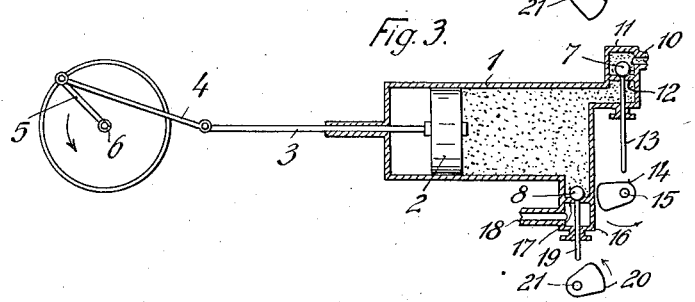
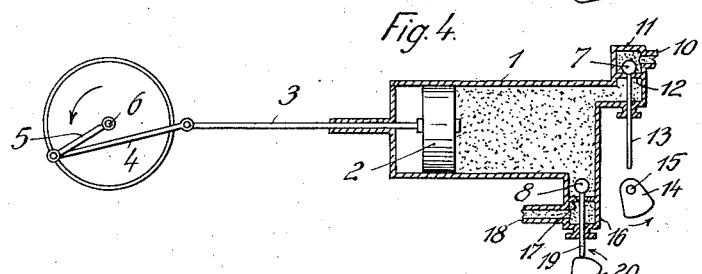
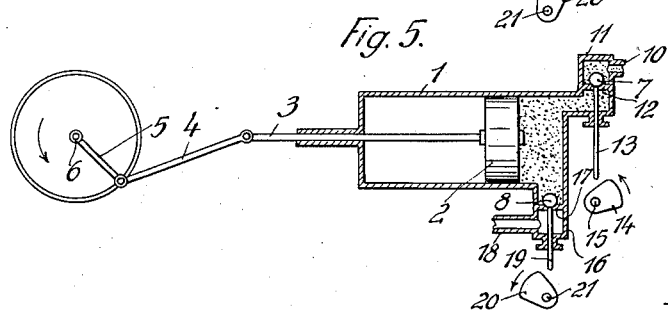
Inventor:
Hermann Pittlick
by Karl Lichtig
Atty.

Patented Aug. 27, 1935

2,012,319

UNITED STATES PATENT OFFICE 2,012,319

PRESSURE RELEASING DEVICE

Hermann Pittlick, Herne-Sodingen, Germany; Olga Pittlick, née Liebner, administratrix of said Hermann Pittlick, deceased, assignor to Hochdruck-Apparate-Bau G. m. b. H., Dortmund, Germany Application July 7, 1932, Serial No. 621,320 In Germany July 11, 1931

8 Claims. (Cl. 137—111)

My invention relates to a pressure releasing device serving for discharging erosive fluid suspensions and the like from reaction vessels in which they are stored under pressure.

The discharging of solids, liquids, gases or mixtures thereof from a chamber, for instance from a reaction chamber, in which they are stored under high pressure, against a much lower, for instance, atmospheric pressure, involves considerable difficulties on account of the high pressure gradient and high flow velocity of the substances. The substances or mixtures often possess erosive, abrasive and corrosive properties which are detrimental to the pipe lines, valves, etc., through which the flowing substances are discharged.

It is an object of my invention to eliminate these difficulties. To this end I provide means whereby the pressure gradient between the substance to be discharged and the medium into which it is discharged, is reduced to a limit within which objectionably high velocities are not attained.

For instance, if it is desired to discharge an erosive fluid suspension which may be a solid or a liquid suspended in a gas or liquid, into the ambient air, I may proceed as follows: I employ an expansion chamber which in effect is a pressure-releasing pump or a pressure lock and in which at the beginning of a cycle, the residual mixture from a previous cycle is compressed to a pressure which may be equal to the pressure in the pressure vessel or reaction chamber and at any rate is so determined that the gradient between the pressure in the chamber and the initial compression pressure will not bring about an unduly high flow velocity. Obviously the pressure gradient and the resulting velocity of flow must be determined in conformity with the erosive or other detrimental properties of the media to be discharged. When the desired initial compression pressure has been attained, fresh mixture from the chamber is admitted to the mixture which has already been compressed, and the whole is expanded down to a certain pressure which may be equal to the pressure of the ambient air. At this pressure part of the mixture is discharged the discharge being cut off before all of the mixture has been completely discharged. The residual mixture is then compressed again up to the initial compression pressure, and a fresh cycle is started.

In the manner described, the liquid or mixture is discharged from the reaction chamber against a pressure which may be equal to its own pressure and under all conditions must be so related to its own pressure that undesirably high flow velocity will not occur. After the pressure on the liquid gas or mixture has been released, it is finally discharged at a pressure which may be equal to the pressure against which it is discharged, for instance, the pressure of the ambient air, and must be so determined that high pressure gradients at the initial and at the final stages of the discharging operation are avoided, and the discharge occurs at a flow velocity which will not bring about detrimental erosive or other actions.

In the drawing affixed to this specification and forming part thereof a pressure diagram and a pressure releasing device embodying my invention, are illustrated diagrammatically by way of example.

In the drawing:—

Fig. 1 is the pressure diagram, and

Figs. 2 to 5 are axial sections of the releasing device, showing the several stages of the discharging operation.

Referring now to the drawing, and first to Fig. 1, pressures are plotted against piston strokes in the usual manner. At $a$, a residual amount of fluid suspension which is still present after the completion of a cycle, has been compressed to the initial pressure of the next cycle, which in the present instance is assumed to be equal to the pressure in the reservoir or reaction chamber. From $a$ to $b$ the inlet of the cylinder is held open and the suspension flows in at a substantially uniform pressure. At $b$, the admission of fresh suspension from the reservoir is cut off and the suspension initially present plus the fresh suspension is expanded. The outlet is opened at $c$ when a predetermined pressure has been attained which in the present instance is assumed to be substantially equal to the pressure of the ambient air. The suspension is now discharged under this uniform pressure from $c$ to $d$. At $d$, the outlet is cut off and the residuum which is still present, is compressed to the initial pressure for the next cycle. The cut-off at $d$ must be so timed that the amount still present is sufficient to make up the initial pressure for the next cycle. The operation $a$ to $b$ to $c$ represents the expansion stroke and $c$ to $d$ to $a$ the compression stroke of the piston.

Referring now to Figs. 2 to 5, 1 is a cylinder, with a piston 2, a piston rod 3, a connecting rod 4, a crank 5 and a crank shaft 6. 7 is the inlet, and 8 is the outlet valve. 9 is a reservoir, for instance, a reaction chamber, which contains the fluid suspension to be discharged. 10 is a pipe extending from the reservoir 9 to the casing 11 of the inlet valve 7 which is here shown as a ball valve on a seat 12, with a pusher 13 and a cam 14 on a cam shaft 15. The outlet valve 8 is arranged in a casing 16 on a seat 17, 18 is a discharge pipe connecting the casing to the atmosphere, 19 is a push rod, 20 is a cam and 21 is a cam shaft for operating the outlet valve. The casings 11 and 16 are connected to the outer end of the cylinder 1.

Any suitable mechanism may be provided for operating the cams 14 and 20. By way of example in Fig. 2 I have shown a conventional mechanism which includes bevel gearing 22, 23 and a shaft 24 for rotating the shaft 15 of cam 14, and bevel gearing 25, 26 and a shaft 27 for rotating the shaft 21 of cam 20. The shafts 24 and 27 are rotated from a shaft 28 through a worm 29 and a worm wheel 30, and a worm 31 and a worm wheel 32, respectively. Rotation is imparted to the shaft 28 through bevel gearing 33, 34, an intermediate shaft 35, a bevel pinion 36 at the upper end of the intermediate shaft, and a bevel gear 37 on the crank shaft 6.

The cylinder 1 with its piston 2 and its valve gear acts as a lock or as a pressure-reducing pump for the mixture in the reservoir or reaction chamber 9. It controls the release of the mixture from the chamber, the discharge of the mixture from the cylinder 1 after it has expanded therein, and the re-compression of the mixture which is left in the cylinder after the outlet valve 8 has closed at d, Fig. 1. A certain amount of energy is transmitted to the piston 2 of the compressor during the expansion stroke a—b—c, but this is a secondary consideration.

Fig. 2 shows the position of the parts during the expansion stroke. The inlet valve 7 has been opened by its cam 14 at or near the outer dead centre position of the piston and held open until the end of the admission period. The outlet valve 8 is closed. At the closing of the inlet valve 7 the expansion begins. Fig. 3 shows the piston 2 near the end of the expansion stroke. The outlet valve 8 is still closed but is opened at or near the inner dead centre position of the piston 2, Fig. 4, whereupon the discharge of the mixture through pipe 18 begins at the start of the compression stroke. The outlet valve 8 must open at the moment when the fluid suspension in the cylinder has expanded down to, or substantially to, the pressure of the ambient air against which it is discharged, and is held open until the beginning of the compression stroke while the inlet valve 7 remains closed. Near the completion of the compression stroke outlet valve 8 is closed in order to entrap in the cylinder the residual amount of suspension which is required for building up the initial pressure at a, Fig. 1. The inlet valve 7 remains closed and the contents of the cylinder is compressed until the inlet valve opens at or near the outer dead centre and a fresh cycle begins.

The energy which is liberated during the cycle may be utilized in any suitable manner.

It is not necessary that the inlet valve 7 and the outlet valve 8, or one of them should be positively controlled by their respective pushers 13 and 19 throughout, but they may be partly automatic, the inlet valve 7 opening automatically as soon as the compression pressure at *a*, Fig. 1, begins to overstep the reservoir pressure, and the outlet valve 8 opening automatically as soon as the expansion pressure begins to understep the pressure of the ambient air. The pushers 13 and 19, under the control of their cams, follow the automatically opened valves and hold them open for the required periods.

Obviously it is necessary that the properties of the material to be discharged from the reservoir or reaction chamber 9 should be considered in performing the operation of the pump.

As mentioned, the object of my invention is also attained if the substance is not quite under the reservoir pressurt at point *a*, Fig. 1, and is not quite under the pressure of the ambient air at point *c* but whenever the respective pressures are so selected that velocities at which detrimental action on the valves etc., may occur, are avoided.

Various changes may be made in the details disclosed in the foregoing specification without departing from the invention or sacrificing the advantages thereof.

I claim:—

1. A method for discharging a compressible and erosive fluid mixture from a high pressure reaction chamber to a point of materially reduced pressure, which comprises exhausting the mixture from the high pressure chamber into an expansion zone containing a compressed fluid material at a predetermined pressure such that the velocity of flow of the mixture into the expansion zone is of a non-erosive order, expanding the mixture in the expansion zone to a pressure approaching said materially reduced pressure, then discharging a portion of the expanded mixture from the expansion zone to said point of reduced pressure while retaining another portion thereof in the expansion zone, compressing the retained portion of the mixture in the expansion zone to said predetermined pressure for use as said compressed fluid material in the next cycle of operation, and repeating the operating cycle as aforesaid.

2. The process of claim 1 wherein the mixture is expanded in said expansion zone to a pressure below that of the said materially reduced pressure and is compressed in said zone to a pressure above that of said high pressure zone.

3. A method for discharging compressible and erosive fluid suspensions from high pressure reaction chambers to a point of relatively low pressure, which comprises exhausting such a suspension from a high pressure chamber into an expansion zone containing a compressed fluid material at substantially the pressure of the high pressure chamber, expanding the resulting mixture in the expansion zone to substantially said relatively low pressure, then discharging a portion of the expanded mixture from the expansion zone to said point of low pressure while retaining another portion thereof in the expansion zone, compressing the retained portion of the mixture in the expansion zone to substantially the pressure of the high pressure chamber to constitute said compressed fluid material for the next cycle of operation, and repeating the operating cycle as aforesaid.

4. In the discharge of compressible and erosive fluid suspensions from high pressure reaction chambers, containing the same, the method of eliminating the erosive action of the mixture during the discharge which comprises exhausting such a suspension from the high pressure chamber into an expansion zone containing fluid material compressed to a pressure approaching that of the high pressure chamber, expanding the resulting mixture in the expansion zone to substantially atmospheric pressure, then discharging a portion of the expanded mixture from the expansion zone, compressing the retained portion of the mixture in the expansion zone to a pressure approaching that of the high pressure chamber, and utilizing such compressed and retained portion of the mixture as said fluid material in another cycle of operation as aforesaid.

5. A device for releasing normally erosive fluid suspensions and the like under high pressures from reaction vessels without the production of erosion, which comprises a cylinder, a piston, means for reciprocating said piston in said cylinder, thereby producing an expansion stroke and a compression stroke, means including a valve for introducing a fluid suspension under high pressure into said cylinder from said reaction vessel prior to the completion of said expansion stroke, means including a second valve for discharging the bulk of said fluid suspension from said cylinder prior to the completion of said compression stroke and under substantially atmospheric pressure, and operating means for opening and closing said valves cooperating with said reciprocating means to close said second valve prior to the completion of said compression stroke thereby retaining in said cylinder sufficient fluid suspension to produce therein substantially the pressure of said reaction vessel upon completion of said compression stroke and at the point of opening of said first mentioned valve.

6. The device of claim 5 wherein said first valve is a check valve.

7. The device of claim 5 wherein both said first valve and said second valve are check valves.

8. The device of claim 5 wherein said operating means is adjusted to close said first valve prior to the completion of said expansion stroke.

HERMANN PITTLICK.